United States Patent [19]
Borys

[11] Patent Number: 4,778,314
[45] Date of Patent: Oct. 18, 1988

[54] METHOD OF MACHINING GROOVES IN SHAFTS AND LIKE WORKPIECES

[75] Inventor: Wulf E. Borys, Bad Durkheim, Fed. Rep. of Germany

[73] Assignee: Klein, Schanzlin & Becker Aktiengesellschaft, Frankenthal/Pfalz, Fed. Rep. of Germany

[21] Appl. No.: 74,926

[22] Filed: Jul. 17, 1987

[30] Foreign Application Priority Data

Jul. 23, 1986 [DE] Fed. Rep. of Germany ....... 3624806

[51] Int. Cl.⁴ .................................................. B23C 3/30
[52] U.S. Cl. ........................................ 409/132; 409/177
[58] Field of Search ............... 409/76, 77, 78, 131, 409/132, 174, 177, 190, 228, 229, 66; 82/18

[56] References Cited

U.S. PATENT DOCUMENTS

| | | | |
|---|---|---|---|
| 1,614,558 | 1/1927 | Kasley | 409/131 |
| 2,397,086 | 3/1946 | Brady | 409/132 |
| 2,453,315 | 11/1948 | Harbison | 409/177 |
| 3,466,972 | 9/1969 | Strait | 409/177 |
| 3,678,802 | 7/1972 | Butter | 409/132 |
| 4,683,787 | 8/1987 | Link | 409/132 |

FOREIGN PATENT DOCUMENTS

| | | | |
|---|---|---|---|
| 583932 | 10/1958 | Italy | 409/177 |
| 823014 | 4/1981 | U.S.S.R. | 409/132 |
| 1005890 | 9/1965 | United Kingdom | 409/190 |

Primary Examiner—Gil Weidenfeld
Assistant Examiner—Daniel W. Howell
Attorney, Agent, or Firm—Peter K. Kontler

[57] ABSTRACT

A method of machining an axially parallel groove in the periphery of a shaft includes fixedly mounting the shaft in the main spindle of a CNC turning machine, moving a rotating milling tool (whose diameter decreases in a direction from its free end and whose maximum diameter is less than the desired width of the groove) radially and axially of the shaft so as to form a first portion of the groove and to finish one of the lateral surfaces which bound the groove, extracting the tool and changing the angular position of the shaft through an angle which equals or approximates the taper of the tool), and again moving the tool axially of the shaft to complete the machining of the groove and to simultaneously form the other lateral surface. The tool can be reground a substantial number of times so that its useful life is a multiple of that of cylindrical milling tools having a diameter which matches the desired width of the groove.

5 Claims, 1 Drawing Sheet

METHOD OF MACHINING GROOVES IN SHAFTS AND LIKE WORKPIECES

BACKGROUND OF THE INVENTION

The invention relates to methods of machining grooves in shafts and other rotary workpieces, and more particularly to improvements in methods of machining elongated (particularly axially parallel) grooves in the peripheries of shafts and the like.

If a shaft is to be provided with an axially parallel groove in a CNC turning machine wherein the tool is rotated, the machine employs a milling tool whose diameter matches the desired width of the groove. The tool is moved in the radial and axial directions of the workpiece, and the groove is machined in a single operation. A drawback of such methods of machining grooves is that the tool must be discarded as soon as it has undergone a certain amount of wear, i.e., the tool cannot be subjected to a grinding and/or other finishing treatment preparatory to renewed use. Therefore, the machining of grooves in CNC turning machines is too expensive for a large number of purposes.

Grooves, channels, recesses and similar cavities are also machined in milling machines wherein the removal of material is effected in several steps by a milling tool whose diameter is less than the desired width of the groove. When the first material removing step is completed, the milling tool is moved sideways prior to renewed penetration into the material of the workpiece. Reference may be had to German Auslegeschrift No. 11 53 966. Such sidewise movement of the tool is not possible in a turning machine without special (expensive) equipment.

OBJECTS AND SUMMARY OF THE INVENTION

An object of the invention is to provide a novel and improved method of machining grooves, recesses, depressions, channels and/or similar cavities in the peripheries of shafts and other rotary workpieces in a turning machine.

Another object of the invention is to provide a method which renders it possible to utilize one and the same tool for the making of a large number of grooves with the same degree of accuracy and predictability.

A further object of the invention is to provide a novel and improved tool for use in a turning machine to make elongated grooves or like formations in rotary workpieces.

An additional object of the invention is to provide a machine which employs the above outlined tool.

Still another object of the invention is to provide a simple and inexpensive method of making grooves in shafts and like workpieces in existing machine tools, such as in CNC turning machines.

A further object of the invention is to provide a method which is cheaper than heretofore known methods and which can be resorted to for the machining of grooves with any desired degree of precision.

The improved method can be used to machine an elongated groove of predetermined width, particularly an axially parallel groove, in a shaft or an analogous rotary workpiece with a conical milling tool, preferably a tool whose diameter decreases in a direction away from its free end. The method comprises the steps of maintaining the workpiece in a fixed axial and angular position, rotating the tool about its axis and feeding the rotating tool against the workpiece in the radial and at least one additional direction of the workpiece to form in the workpiece a first portion of the groove and one of the lateral surfaces which bound the finished groove, changing the angular position of the workpiece, and feeding the tool to form the remaining portion of the groove including the other of the lateral surfaces which bound the finished groove.

The step of changing the angular position of the workpiece includes turning the workpiece about its axis through an angle which is a function of the conicity of the tool and which is also a function of permissible or selected tolerances in mutual spacing and inclination of the lateral surfaces bounding the finished groove.

The maintaining step can include installing the workpiece in the main spindle of a turning machine, particularly a CNC turning machine.

The additional direction is or can be parallel to the axis of the workpiece.

The difference between the maximum diameter of the tool and the predetermined width is preferably a small fraction, particularly less than 5 percent, of the predetermined width. For example, if the width of the finished groove is 10 mm, the maximum diameter of the turning tool can be about 9.7 mm.

The novel features which are considered as characteristic of the invention are set forth in particular in the appended claims. The improved method itself, however, together with additional features and advantages thereof, will be best understood upon perusal of the following detailed description of certain specific embodiments with reference to the accompanying drawing.

DESCRIPTION OF THE PREFERRED EMBODIMENTS

Figure 1:
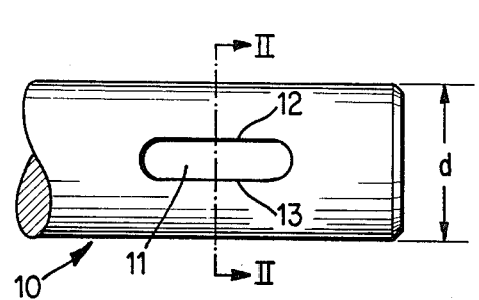
FIG. 1 is a fragmentary elevational view of a shaft having a groove which is or can be formed in accordance with the improved method.
Figure 2:
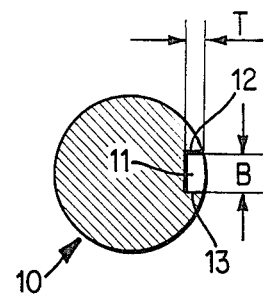
FIG. 2 is a sectional view as seen in the direction of arrows from the line II—II of FIG. 1.

FIGS. 1 and 2 show a portion of a workpiece in the form of a cylindrical shaft 10 having a diameter d and being provided with an elongated axially parallel groove 11 having a width B. The longitudinally extending lateral surfaces which bound the groove 11 are shown at 12 and 13. The depth of the groove 11 is shown at T. The lateral surfaces 12 and 13 are or can be parallel to each other. The groove 11 can serve to receive a feather or any other component part which is to fit therein with a requisite degree of precision, i.e., with a minimum of play.

Figure 3:
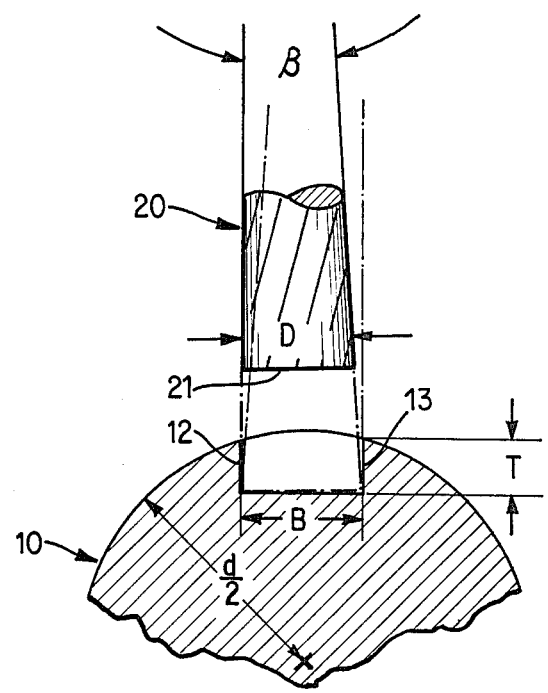
FIG. 3 is a fragmentary elevational view of a milling tool which can be used for the practice of the improved method, the first position of the tool with reference to a workpiece being shown by solid lines and a second position of the tool with reference to the workpiece being shown by phantom lines, the workpiece being shown in a fragmentary sectional view similar to that of FIG. 2.

FIG. 3 shows a portion of a milling tool 20 which tapers gradually in a direction away from its free end 21. The maximum diameter D of the tool 20 is only slightly less than the width B of the groove 11 in the finished workpiece 10. For example, if the width B of the groove 11 is 10 mm, the maximum diameter D of the tool 20 is or can be 9.7 mm. The diameter d of the workpiece 10 is assumed to be 35 mm, and the depth T of the groove 11 is assumed to be 4.7±0.2 mm. The permissible tolerance for B is assumed to be 0.036 mm. The angle beta (denoting the taper of the tool 20) is 0.45°. The angle beta equals or very closely approximates the angle alpha through which the workpiece 10 must be turned during the interval between the first and second material removing steps, and such angle is calculated on the basis of the following equation:

$$\text{Alpha} = \text{arc tan} \cdot \frac{B-D}{d}$$

The angle alpha equals 0.49° if the values of d, B, T and D are as outlined above.

FIG. 3 shows by solid lines the angular position of the tool 20 with reference to the workpiece 10 prior to initial feeding of the tool against the workpiece 10 in the radial and axial directions of the workpiece in order to form a first portion of the final or finished groove 11 jointly with the lateral surface 12. The angular position of the workpiece 10 is then changed by the angle alpha in any direction, as seen in FIG. 3. For the sake of convenience, FIG. 3 shows the workpiece 10 in unchanged position and the inclination of the tool 20 changed by the angle alpha so that the tool assumes the phantom-line position subsequent to its extraction from the initially formed portion of the groove 11 and prior to removal of additional material to form the remainder of the groove 11 and to simultaneously form the lateral surface 13. The workpiece 10 can be held in the main spindle of a CNC turning machine, e.g., a machine which is made and sold by the West German firm Gildemeister. The tool 20 may be similar to those distributed by Max Müller Brinker Maschinenfabrik, D-3000 Hannover 1, West German. Müller Brinker is a subsidiary of Gildemeister.

In the first step, the workpiece 10 is fixed against axial and angular movement in the position of FIG. 3 (e.g., in the main spindle of the aforementioned conventional turning machine). The tool 20 is then moved to the solid-line position of FIG. 3 and is rotated about its axis while being fed toward and into the material of the workpiece 10 in the radial and axial directions of the workpiece to form the major part of the groove 11 and the lateral surface 12. Then the angular position of the workpiece 10 is changed by the angle alpha as a result of numerically indexing the main spindle before the rotating tool is again caused to move radially and axially of the workpiece to complete the formation of the groove 11 and to simultaneously form the lateral surface 13. The extent of angular displacement of the workpiece 10 about its axis between the first and second feeding steps is a function of the taper (angle beta) of the tool 20 and also a function of the selected or permissible tolerances in the width T and mutual inclination of the lateral surfaces 12, 13 bounding the finished groove 11.

It is already known to use a milling tool with a diameter less than the width of the groove to make grooves in shafts and similar rotary workpieces. The tool has a constant diameter and the width of the groove is increased beyond the initial width during first penetration of the small-diameter tool by moving the workpiece sideways. In contrast to such conventional mode of machining grooves, the improved method provides for an angular movement of the workpiece upon completion of the first material step, i.e., a movement which is not contemplated and not possible in a milling machine wherein the workpiece is caused to move sideways rather than rotate about its axis as in a turning machine.

The dimensions of the finished groove would depart considerably from the desired dimensions if the conical tool 20 of FIG. 3 were replaced with a cylindrical tool without taper as is customary in milling machines which are used to make grooves in the conventional way. More specifically, the dimensions of the finished groove which would be obtained with a conventional cylindrical tool would depart from the desired dimensions because the mutual inclination of the lateral walls 12, 13 would depart from the desired or optimum inclination. Departures from a desired inclination of lateral walls 12, 13 are reduced to a minimum (well within the acceptable tolerances) if the groove is machined with a tapered tool and if the relationship of the angle beta to the angle alpha and to the desired tolerances is selected in the aforedescribed manner. Thus, the angle beta can equal or approximate the angle alpha.

It has been found that the cost of tools for the making of grooves in accordance with the improved method is only approximately ten percent of the cost of tools which are used for the making of grooves with a width corresponding to the diameter of a cylindrical tool. This is due to the fact that a tapering tool 20 can be reground up to 15 times whereas a tool whose diameter matches the width of the groove cannot be reground at all.

If desired or necessary it is also possible to withdraw the tool after forming the major part of the groove 11 and the lateral surface 12. Then the angular position of the workpiece 10 is changed before the rotating tool is again caused to move radially and axially of the workpiece to complete the formation of the groove 11 and to simultaneously form the lateral surface 13.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of machining with a conical milling tool an elongated groove of predetermined width in a shaft or an analogous rotary workpiece having an axis which is parallel to the groove, comprising the steps of maintaining the workpiece in a fixed axial and angular position; orienting the conical tool with its axis disposed substantially radially of the workpiece and its diameter decreasing in a direction away from the axis of the workpiece; rotating the tool about its axis; feeding the rotating tool against the workpiece in the radial direction and along a linear path in at least one additional direction of the workpiece to form in the workpiece a first portion of the groove and to provide the workpiece with one of the lateral surfaces bounding the finished groove; changing the angular position of the workpiece; and feeding the tool in either direction along said linear path without a change of orientation to thereby form the remaining portion of the groove as well as the other of the lateral surfaces bounding the finished groove.

2. The method of claim 1, wherein the tool has a predetermined conicity and its diameter decreases in a direction from its forward end, said step of changing the angular position of the workpiece including turning the workpiece about its axis through an angle $$\text{arc tan} \cdot \frac{B - D}{d}$$

wherein B is the width of the finished groove, D is the maximum diameter of the tool and d is the diameter of the workpiece.

3. The method of claim 1, wherein said maintaining step includes installing the workpiece in the main spindle of a turning machine.

4. The method of claim 1, wherein said additional direction is parallel to the axis of the workpiece.

5. The method of claim 1, wherein the difference between the maximum diameter of the tool and the predetermined width is less than 5 percent of the predetermined width.

* * * * *